3,084,145
BROMINATED AMORPHOUS COPOLYMERS OF ETHYLENE AND HIGHER ALPHA OLEFINS WITH AMINES

Henry S. Makowski, Roselle Park, and Charles W. Seelbach, Cranford, N.J., assignors to Esso Research and Engineering Company, a corporation of Delaware
No Drawing. Filed Jan. 13, 1958, Ser. No. 708,370
6 Claims. (Cl. 260—88.2)

This invention relates to the preparation of brominated copolymers. More particularly, the invention relates to the preparation of brominated rubbery amorphous copolymers of ethylene and higher alpha olefins and to the preparation of synthetic rubbers therefrom.

The preparation of amorphous rubbery copolymers of ethylene and higher alpha olefins by the low pressure polymerization process is described in copending application 672,435, filed July 17, 1957.

It has now been found that amorphous rubbery copolymers of ethylene and higher alpha olefins can be brominated to form brominated copolymers which then can be treated with certain curing agents to form synthetic rubbers having excellent mechanical, dynamic and aging properties.

The amorphous rubbery copolymers of ethylene and higher alpha olefins used to form the brominated copolymers and the corresponding synthetic rubbers of the invention contain from 5 to 95 mol percent, preferably 30 to 70 mol percent of ethylene with 95 to 5 mol percent, preferably 70 to 30 mol percent of an alpha olefin containing 3 to 6 carbon atoms, have a tensile strength in the range of from 2 to 500 p.s.i., a melting point below about 50° C., a solubility in xylene at 100° C. greater than 15 wt percent, an apparent modulus of elasticity at −50° C. of less than $1 \times 10^5$ p.s.i., a crystallinity of less than 10% as shown by X-ray analysis, and a molecular weight of from 5,000 to 500,000. These copolymers can be prepared by any known process, such as the low pressure polymerization process or the high pressure polymerization process; see e.g. Belgian Patent 533,362, "Chemical and Engineering News," April 8, 1957, pages 12 through 16, "Petroleum Refiner," December 1956, pages 191 through 196 and copending application 672,435, filed July 17, 1957. Ethylene-propylene copolymers are preferred due to their low cost. These amorphous rubbery copolymers do not contain sufficient unsaturation to enable them to be cured by conventional curing agents such as sulfur or resins. Also, these copolymers contain such a slight amount of unsaturation that they cannot be brominated to any appreciable extent by the addition of bromine across their double bonds.

Surprisingly therefore, it was discovered that these copolymers can be brominated when the bromination is carried out in solvents which are capable of dissolving or swelling the copolymer and which do not react rapidly with the brominating agent. Satisfactory solvents are aliphatic and aromatic hydrocarbons and their halogenated derivatives, such as n-heptane, benzene, chloroform, carbon tetrachloride, ethylene dichloride, and chlorobenzene; with carbon tetrachloride and chlorobenzene being particularly preferred because of their excellent solvent power and nonreactivity with the brominating agents.

The bromination of these copolymers is carried out by treatment of the copolymer in an appropriate solvent with a brominating agent which is preferably elemental bromine, although other brominating agents such as N-bromosuccinimide can also be used. In particular, the bromination of the copolymers is carried out by first preparing a copolymer solution having from 20 to 150 grams of copolymer per liter of solvent, preferably from 80 to 100 grams of polymer per liter of solvent, and then treating the copolymer solution with a brominating agent. The brominating agent is employed in quantities which will produce brominated copolymers having from 1 to 50 wt. percent bromine, preferably 1 to 10 wt. percent and more preferably from 1 to 5 wt. percent bromine therein. The amount of brominating agent used is calculated on 100% bromination. If bromination takes place to an extent less than 100%, the quantity of brominating agent is adjusted to obtain brominated copolymers having the desired amount of bromine therein. The bromination is carried out at temperatures of from 20° to 130° C. preferably 75 to 110° C. The brominated copolymers are then isolated by standard techniques known to the art.

The curing agents which react with the brominated copolymers to form the synthetic rubbers of the invention are metal salts, metal oxides, metal powders, amines and polyamines. In general, the metal components of the metal salts, metal oxides, and metal powders are chosen from groups IIA, IIB of the periodic table, and tin, copper and iron. Particularly useful are the metal oxides, sulfides, nitrates, phosphates, sulfates, and organic acid salts of groups IIA and IIB metals particularly Zn, Cd, Mg, iron and lead. Also particularly preferred are amines and polyamines; in particular, any diamine, triamine, and higher polyamine having one or more of the following types of amino groups; (a) unsubstituted amino groups, (b) mono-substituted amino groups, (c) disubstituted amino groups, and (d) heterocyclic amines such as pyridine. The substituents on the mono- and disubstituted amino groups are one or more of alkyl, aryl and heterocyclic groups. An added advantage in using these polyamines is that they not only effectively produce the cured copolymers of the invention but they also act as antioxidants and stabilizers.

The reaction between the brominated copolymers and the curing agent is carried out by mixing from 1 to 40 parts, preferably 5 to 20 parts, and more preferably 5 to 10 parts by weight of a metal salt or oxide with 100 parts by weight of copolymer. When the compound is a polyamine, from 0.5 to 15 parts, preferably from 1 to 8 parts, and more preferably from 2 to 6 parts by weight of polyamine per 100 parts by weight of copolymer is used. The reaction temperature employed is in the range of from 225° F. to 350° F. preferably 280 to 320° F. and more preferably about 310° F.

Fillers such as carbon blacks, silica, mica, various clays and the like can be used, and in general their use is preferred. From 5 to 150 parts, preferably 30 to 60 parts of filler per 100 parts of polymer is used. Highly desirable cured copolymers are prepared with 50 parts of carbon black per 100 parts of copolymer. A wide variety of carbon blacks can be employed as fillers, e.g. furnace blacks, channel blacks, thermal blacks, lamp blacks, acetylene blacks and the like.

The reaction is carried out by mixing the brominated copolymer, the compound adapted to react with the brominated copolymer, and the filler, if any, in a rubber mill and heating the mixture to reaction temperature. The mixing can also be carried out in other rubber compounding equipment such as Banbury mixers or kneaders.

The invention will be better understood from the following examples. It is to be noted that values given in the examples and tables for tensile strength and elongation are measured on 20–25 mil thick micropads unless otherwise noted.

EXAMPLE I 90.0 grams of an ethylene-propylene copolymer having the properties shown in Table I were mixed with 1.4 liters of $CCl_4$ in a 3-liter 3-neck flask. The mixture was heated to 70° C. with stirring, which was continued at this temperature until a homogeneous paste was obtained. There was then added to this paste with stirring a solution of 30.0 grams of bromine in 100 ml. of $CCl_4$ over a period of 30 minutes. The reaction mixture was then stirred for another 4 hours at 70° C. During the last two hours nitrogen was bubbled through the reaction mixture to facilitate the removal of hydrogen halide, which was probably a mixture of HCl and HBr. Then a volume of acetone equal to the volume of the reaction mixture was added to the reaction mixture, resulting in precipitation of the copolymer which was then isolated, thoroughly washed, and kneaded with acetone. The copolymer was then banded on a warm mill, partially dried, formed into a sheet, and dried under vacuum at 50° C. The solid copolymer product weighed 95.5 grams and contained 10.35 wt. percent halogen (Paar determination). Some of the halogen present was chlorine, which was introduced into the copolymer by reaction involving the $CCl_4$ diluent. Evaporation of the mother liquor from the reaction left as a residue 4.1 g. of an oily copolymer. The properties of the brominated copolymer, the reaction conditions, and the properties of the unsubstituted copolymer are listed in Table I.

EXAMPLES II THROUGH VIII

Copolymers having the properties and compositions shown in Table I were brominated by the procedure of Example I using the quantities or reactants and reaction conditions given in Table I.

Examples IX to XIV relate to the curing of the brominated copolymers of the invention with polyamines.

EXAMPLE IX 100 g. of the brominated copolymer prepared by the process of Example I, which contained 10.35 wt. percent halogen was mixed with 50 g. of carbon black on a warm rubber mill. 2 g. of m-phenylenediamine was then added to the polymer mixture at room temperature. The mixture scorched badly during mixing. From this it can be seen that brominated polymers having halogen contents above 10 wt. percent are difficult to process when amines and polyamines are used as curing agents. Special precautions are required to prevent scorching of high bromine content copolymers.

EXAMPLES X THROUGH XII

The brominated copolymers of Examples VI, VII and VIII respectively were treated according to the process of Example IX with either curing mixture A which is composed of 100 parts brominated copolymer, 4 parts m-phenylenediamine, and 4 parts stearic acid, or curing mixture B which is composed of 100 parts brominated copolymer, 50 parts carbon black, 4 parts m-phenylenediamine, and 4 parts stearic acid. The curing mixture used, the conditions of cure, and the properties of the cured copolymers are also given in Table II. Additionally, the properties of the corresponding brominated copolymers and

*Table I*

| | I | II | III | IV | V | VI | VII | VIII |
|---|---|---|---|---|---|---|---|---|
| Ethylene-propylene copolymer used: | | | | | | | | |
| Mole percent propylene | 14.1 | 9.2 | 9.1 | 42 | 15 | 42 | 42 | 42 |
| Inherent viscosity, $\eta i$ [1] | 1.75 | 1.42 | 1.50 | 1.86 | 1.96 | 1.48 | 1.48 | 1.48 |
| Tensile strength, p.s.i. | 128 | 170 | 630 | 145 | 128 | 285 | 285 | 285 |
| Elongation, percent | 660 | 360 | 180 | 444 | 660 | 80 | 80 | 80 |
| Softening point, °C | 52 | <30 | <31 | 34 | 50 | <30 | <30 | <30 |
| Melting point, °C | 82 | 34 | 75 | 55 | 70 | <30 | <30 | <30 |
| Reaction conditions: | | | | | | | | |
| Solvent | $CCl_4$ | $CCl_4$ | $CCl_4$ | (a) | $C_6H_6$ | $C_6H_6$ | $C_6H_6$ | $C_6H_6$ |
| Total volume, ml | 1500 | 1500 | 1500 | 1200 | 1200 | 1500 | 1500 | 1500 |
| Copolymer, grams | 90 | 100 | 100 | 70 | 70 | 100 | 100 | 100 |
| Copolymer conc., g./l | 60 | 67 | 67 | 58 | 58 | 67 | 67 | 67 |
| Bromine, g | 30.0 | 11.1 | 29.1 | 22.4 | 15.0 | 30.0 | 20.0 | 10.0 |
| Temperature, °C | 70 | 70 | 70 | 70 | 75 | 70 | 70 | 70 |
| Reaction time, hr | 4.5 | 3.5 | 6.5 | 1 | 2 | 5.5 | 3.67 | 3.5 |
| Product: | | | | | | | | |
| Total copolymer, g | 99.6 | 100.4 | 103.7 | 75.6 | 77.7 | 101.9 | 99.9 | 102.8 |
| Percent yield [2] | 95 | 95 | 90 | 93 | 100 | 89 | 90 | 98 |
| Oily copolymer | 4.1 | 4.4 | 6.1 | 2.4 | 1.2 | 4.7 | 4.6 | 6.5 |
| Brominated copolymer | 95.5 | 96.0 | 97.6 | 73.2 | 76.5 | 97.2 | 95.3 | 96.3 |
| Inherent viscosity, $\eta i$ [1] | [7] 1.03 | 0.871 | [7] 0.517 | 1.66 | 1.60 | [7] 0.962 | 1.27 | 1.25 |
| Halogen, weight percent [6] | [3] 10.35 | [3] 0.93 | [4] 8.77 | [4] 4.95 | [5] 2.93 | [5] 5.76 | [5] 1.80 | [5] 2.36 |

[1] In tetralin at 125° C. at a concentration of 1 g./liter for the solid copolymer only.
[2] Based on assumption that the bromine present reacts completely with all the copolymer present and only by substitution.
[3] Paar bomb determination.
[4] Dietert determination: 1.37 weight percent chlorine and 7.40 weight percent bromine.
[5] Dietert determination.
[6] Of solid copolymer.
[7] On the soluble portion of the solid copolymer.
[a] n-heptane.

It can be seen from Table I that amorphous copolymers can be successfully brominated using a wide variety of reaction conditions and solvents.

the corresponding unbrominated copolymers from which the brominated copolymers were prepared are also given in Table II for comparison purposes.

*Table II*

| | X | | XI | | XII | |
|---|---|---|---|---|---|---|
| | Tensile strength, p.s.i. | Elongation, percent | Tensile strength, p.s.i. | Elongation, percent | Tensile strength, p.s.i. | Elongation, percent |
| Unbrominated copolymer | 285 | 80 | 285 | 80 | 285 | 80 |
| Brominated copolymer | 251 | 108 | 232 | 100 | 223 | 116 |
| Curing mixture A: | | | | | | |
| 30' at 310° F | 510 | 70 | 580 | 790 | 530 | 420 |
| 60' at 310° F | 430 | 90 | 620 | 620 | 650 | 380 |
| 90' at 310° F | 560 | 60 | 670 | 720 | 635 | 300 |
| 120' at 310° F | 480 | 90 | 610 | 660 | 645 | 430 |
| Curing mixture B: | | | | | | |
| 30' at 310° F | 1,470 | 330 | | | 1,340 | 380 |
| 60' at 310° F | 1,465 | 305 | | | 1,499 | 420 |
| 90' at 310° F | 1,620 | 320 | | | 1,590 | 430 |
| 120' at 310° F | 1,540 | 290 | | | 1,510 | 480 |

It can be seen from the above table that the physical properties of the polyamine cured brominated copolymers are markedly improved compared to those of both the unbrominated and the brominated copolymers. Also, it can be seen that the addition of carbon black to the curing mixture (as is in curing mixture B) is highly advantageous.

EXAMPLES XIII AND XIV

Brominated copolymers were prepared from amorphous ethylene-propylene copolymers by brominating the latter in benzene according to the process of Example I. The properties of these unbrominated and brominated copolymers are given in Table III.

*Table III*

|  | XIII | | XIV— Brominated copolymer [1] |
|---|---|---|---|
|  | Unbrominated copolymer | Brominated copolymer |  |
| Inherent viscosity, $\eta_i$ | 1.45 | 1.23 | 1.48 |
| Softening point, °C | <25 | | |
| Melting point, °C | 33 | | |
| Tensile strength, p.s.i. | 570 | 420 | 290 |
| Elongation, percent | 80 | 130 | 220 |
| Apparent modulus of elasticity, p.s.i. $\times 10^{-5}$ | | 1.05 | 1.09 |
| Bromine, weight percent | 0 | 3.03 | 4.35 |

[1] The corresponding unbrominated copolymer is a blend of three ethylene-propylene copolymers having the following properties:

| Copolymer | Grams in blend | Tensile strength, p.s.i. | Elongation, percent | Inherent viscosity, $\eta_i$ |
|---|---|---|---|---|
| 1 | 88.0 | 320 | 265 | 1.41 |
| 2 | 84.0 | 350 | 600 | 2.30 |
| 3 | 38.0 | 140 | 620 | 1.60 |

Portions of the above brominated copolymers were used to prepare the following curing mixtures:

Curing mixtures A and B—Compositions as shown for Examples X through XII.

Curing mixture C: Parts
    Brominated copolymer _____ 100
    Carbon black _____ 50
Curing mixture D:
    Brominated copolymer _____ 100
    Carbon black _____ 50
    Stearic acid _____ 4
    2-aminopyridine _____ 4
Curing mixture E:
    Brominated copolymer _____ 100
    Carbon black _____ 50
    Stearic acid _____ 4
    2,6-diaminopyridine _____ 4
Curing mixture F:
    Brominated copolymer _____ 100
    Carbon black _____ 50
    Stearic acid _____ 4
    p-Phenylenediamine _____ 4

The above curing mixtures were prepared by mixing the components in a cool rubber mill (the stearic acid was added before the polyamine). The mixtures were then cured. The tensile strengths and elongations for the cured brominated copolymers are given in Table IV together with the tensile strengths and elongations of the corresponding brominated and unbrominated copolymers for comparison purposes.

*Table IV*

|  | Example XIII | | Example XIV | |
|---|---|---|---|---|
|  | Tensile strength, p.s.i. | Elongation, percent | Tensile strength, p.s.i. | Elongation, percent |
| Unbrominated copolymer | 570 | 80 | | |
| Brominated copolymer | 420 | 130 | 290 | 220 |
| Control: | | | | |
|   30′ | 510 | 680 | | |
|   60′ | 340 | 570 | | |
|   90′ | 470 | 670 | | |
|   120′ | 270 | 500 | | |
| Curing mixture A: | | | | |
|   30′ at 308° F | 755 | 220 | | |
|   60′ at 308° F | 795 | 265 | | |
|   90′ at 308° F | 840 | 240 | | |
|   120′ at 308° F | 830 | 250 | | |
| Curing mixture B: | | | | |
|   30′ at 308° F | 1,320 | 140 | 1,480 | 40 |
|   60′ at 308° F | 1,350 | 230 | 2,880 | 90 |
|   90′ at 308° F | 1,310 | 230 | 2,870 | 40 |
|   120′ at 308° F | 1,400 | 240 | | |
| Curing mixture C: | | | | |
|   30′ at 308° F | 610 | 320 | 1,625 | 330 |
|   60′ at 308° F | 620 | 330 | 1,635 | 300 |
|   90′ at 308° F | 630 | 340 | 1,780 | 300 |
|   120′ at 308° F | 600 | 320 | | |
| Curing mixture D: | | | | |
|   30′ at 308° F | | | 1,750 | 200 |
|   60′ at 308° F | | | 1,840 | 190 |
|   90′ at 308° F | | | 1,910 | 240 |
| Curing mixture E: | | | | |
|   30′ at 308° F | | | 1,380 | 60 |
|   60′ at 308° F | | | 1,970 | 90 |
|   90′ at 308° F | | | 1,670 | 100 |
| Curing mixture F: | | | | |
|   30′ at 308° F | | | 1,710 | 70 |
|   60′ at 308° F | | | 1,580 | 70 |
|   90′ at 308° F | | | 1,820 | 70 |

It can be seen from the data in Table IV that the brominated copolymers of the invention are cured successfully by various polyamines to rubbers having high tension strength and elongations. The addition of fillers such as carbon black to the curing mixtures provides products after curing which have even higher tensile strengths.

Examples XV through XXIII are examples of brominated copolymers cured with either metal salts or metal oxides.

EXAMPLES XV THROUGH XXII

The brominated copolymers prepared in Examples I, III, V, VII, VIII and VI were cured using the curing mixtures and conditions listed in Table V for Examples XV through XX respectively. The brominated copolymer of Example XXI was prepared by brominating an amorphous ethylene-propylene copolymer in benzene and had 0.03 wt. percent bromine and an apparent modulus of elasticity of $1.05 \times 10^{-5}$ p.s.i, at $-50°$ C. The brominated copolymer of Example XXII was prepared by brominating an amorphous ethylene-propylene copolymer in benzene and had 4.35 wt. percent bromine and an inherent viscosity of 1.48. The brominated copolymers of Examples XV through XXII were formed into various curing mixtures and cured. The properties of the brominated and the cured copolymers, the conditions of cure, and the curing mixtures used are given in Table V. The curing mixtures referred to in Table V have the following compositions:

Curing mixture G: Parts
    Brominated copolymer _____ 100
    Carbon black _____ 50
    Zinc oxide _____ 5
    Stearic acid _____ 1
Curing mixture H:
    Brominated copolymer _____ 100
    Carbon black _____ 50
    Zinc oxide _____ 10
    Stearic acid _____ 1
Curing mixture I:
    Brominated copolymer _____ 100
    Carbon black _____ 50

Curing mixture J:  Parts
    Brominated copolymer _____ 100
    Zinc oxide _____ 5
    Stearic acid _____ 1
Curing mixture K:
    Brominated copolymer _____ 100
    Zinc oxide _____ 10
    Stearic acid _____ 1
Curing mixture L:
    Brominated copolymer _____ 100
    Carbon black _____ 50
    Cadmium sulfide _____ 10
Curing mixture M:
    Brominated copolymer _____ 100
    Carbon black _____ 50
    Zinc oxide _____ 10

Curing mixture P:  Parts
    Brominated copolymer _____ 100
    Carbon black _____ 50
    Magnesium oxide _____ 10
Curing mixture Q:
    Brominated copolymers _____ 100
    Carbon black _____ 50
    $Pb_3O_4$ _____ 10

It can be seen from the above table that marked improvement in tensile strength compared to both the unbrominated and the brominated copolymers can be obtained by treating the brominated copolymers with as little as 5 parts of zinc oxide for very short curing times. It was found that a relationship existed between desirable mechanical properties for the cured brominated copoly-

Table V

|  | XV | | XVI | | XVII | | XVIII | | XIX | | XX | | XXI | | XXII | |
|---|---|---|---|---|---|---|---|---|---|---|---|---|---|---|---|---|
|  | T.S.,[1] p.s.i. | E.,[2] percent | T.S., p.s.i. | E., percent | T.S., p.s.i. | E., percent | T.S., p.s.i. | E., percent | T.S., p.s.i. | E., percent | T.S., p.s.i. | E., percent | T.S., p.s.i. | E., percent | T.S., p.s.i. | E., percent |
| Unbrominated copolymer | 128 | 660 | 145 | 444 | 128 | 660 | 128 | 660 | 285 | 80 | 285 | 80 | 285 | 80 | 285 | 80 |
| Brominated copolymer | | | 280 | 280 | | | 232 | 160 | 223 | 116 | 251 | 108 | 420 | 130 | 290 | 220 |
| Curing mixture G: | | | | | | | | | | | | | | | | |
| 15' at 308° F | 1,750 | 136 | | | | | | | | | | | | | | |
| 30' at 308° F | 1,740 | 226 | | | | | 913 | 548 | 1,474 | 420 | 2,077 | 200 | 1,340 | 240 | | |
| 60' at 308° F | 1,550 | 262 | | | | | 1,033 | 520 | 1,429 | 388 | 2,018 | 172 | 1,310 | 230 | | |
| 90' at 308° F | 1,360 | 125 | 1,239 | 348 | 1,540 | 320 | 1,065 | 515 | 1,515 | 387 | 2,013 | 207 | 1,375 | 230 | | |
| 120' at 308° F | | | | | | | 1,097 | 484 | 1,520 | 344 | 2,072 | 188 | 1,410 | 240 | | |
| Curing mixture H: | | | | | | | | | | | | | | | | |
| 30' at 308° F | | | | | | | 890 | 508 | 1,249 | 412 | 2,201 | 208 | 1,400 | 270 | | |
| 60' at 308° F | | | | | | | 972 | 472 | 1,324 | 380 | 2,013 | 192 | 1,260 | 250 | | |
| 90' at 308° F | | | 1,828 | 440 | 2,000 | 390 | 1,047 | 510 | 1,549 | 408 | 2,006 | 176 | 1,300 | 245 | | |
| 120' at 308° F | | | | | | | 1,213 | 536 | 1,503 | 372 | 2,160 | 200 | 1,300 | 250 | | |
| Curing mixture I: | | | | | | | | | | | | | | | | |
| 30' at 308° F | | | | | | | | | | | | | 613 | 324 | 1,625 | 330 |
| 60' at 308° F | | | | | | | | | | | | | 619 | 332 | 1,635 | 300 |
| 90' at 308° F | | | | | | | | | | | | | 633 | 336 | 1,780 | 300 |
| 120' at 308° F | | | | | | | | | | | | | 602 | 316 | | |
| Curing mixture J: | | | | | | | | | | | | | | | | |
| 30' at 308° F | | | | | | | 784 | 896 | 530 | 560 | 381 | 216 | 543 | 270 | | |
| 60' at 308° F | | | | | | | 631 | 760 | 390 | 464 | 324 | 211 | 494 | 376 | | |
| 90' at 308° F | | | | | | | 643 | 872 | 410 | 471 | 382 | 201 | 456 | 300 | | |
| 120' at 308° F | | | | | | | 615 | 804 | 495 | 492 | 372 | 225 | 490 | 355 | | |
| Curing mixture K: | | | | | | | | | | | | | | | | |
| 30' at 308° F | | | | | | | | | | | | | 360 | 220 | | |
| 60' at 308° F | | | | | | | | | | | | | 586 | 430 | | |
| 90' at 308° F | | | | | | | | | | | | | 500 | 420 | | |
| 120' at 308° F | | | | | | | | | | | | | 560 | 390 | | |
| Curing mixture L: | | | | | | | | | | | | | | | | |
| 30' at 308° F | | | | | | | | | | | | | | | 2,470 | 170 |
| 60' at 308° F | | | | | | | | | | | | | | | 2,550 | 210 |
| 90' at 308° F | | | | | | | | | | | | | | | 2,785 | 250 |
| 120' at 308° F | | | | | | | | | | | | | | | | |
| Curing mixture M: | | | | | | | | | | | | | | | | |
| 30' at 308° F | | | | | | | | | | | | | | | 2,230 | 190 |
| 60' at 308° F | | | | | | | | | | | | | | | 2,450 | 190 |
| 90' at 308° F | | | | | | | | | | | | | | | 2,370 | 160 |
| 120' at 308° F | | | | | | | | | | | | | | | | |
| Curing mixture N: | | | | | | | | | | | | | | | | |
| 30' at 308° F | | | | | | | | | | | | | | | 2,430 | 160 |
| 60' at 308° F | | | | | | | | | | | | | | | 2,370 | 160 |
| 90' at 308° F | | | | | | | | | | | | | | | | 150 |
| 120' at 308° F | | | | | | | | | | | | | | | | |
| Curing mixture O: | | | | | | | | | | | | | | | | |
| 30' at 308° F | | | | | | | | | | | | | | | 2,340 | 240 |
| 60' at 308° F | | | | | | | | | | | | | | | 2,350 | 250 |
| 90' at 308° F | | | | | | | | | | | | | | | 2,210 | 250 |
| 120' at 308° F | | | | | | | | | | | | | | | | |
| Curing mixture P: | | | | | | | | | | | | | | | | |
| 30' at 308° F | | | | | | | | | | | | | | | 1,630 | 280 |
| 60' at 308° F | | | | | | | | | | | | | | | 1,680 | 260 |
| 90' at 308° F | | | | | | | | | | | | | | | 2,030 | 250 |
| 120' at 308° F | | | | | | | | | | | | | | | | |
| Curing mixture Q: | | | | | | | | | | | | | | | | |
| 30' at 308° F | | | | | | | | | | | | | | | 1,670 | 300 |
| 60' at 308° F | | | | | | | | | | | | | | | 1,860 | 300 |
| 90' at 308° F | | | | | | | | | | | | | | | 1,900 | 240 |

[1] T.S.—Tensile strength.  [2] E.—Elongation.

Curing mixture N:
    Brominated copolymer _____ 100
    Carbon black _____ 50
    Ferric oxide _____ 10
Curing mixture O:
    Brominated copolymer _____ 100
    Carbon black _____ 50
    Zinc sulfide _____ 10 mers and the inter-relation between the bromine content of the copolymer and the curing time. In general, the higher the bromine content the shorter the curing time required to produce cured copolymers with excellent mechanical properties. It is to be noted that the data given in all of the above tables where carbon black is a component of the curing mixture is given for semi-reinforcing furnace carbon black. Other carbon blacks such as medium thermal carbon black and high modulus furnace carbon black were also used and gave cured copolymers with excellent physical characteristics. It can be seen from the above table that a large variety of metal oxides and metal salts can be used as effective curing agents for the brominated copolymers.

A brominated ethylene-butene-1 copolymer was also prepared by the above bromination process. This copolymer can be cured to give a superior synthetic rubber in accordance with the invention.

EXAMPLE XXIII

The brominated copolymer of Example XXI cured by curing mixture H was formed into two 6" x 6" pads using a 60 minute curing time at a 308° F. curing temperature. The cured pads had the following properties.

| | |
|---|---|
| Tensile strength | 1200 p.s.i. |
| Elongation, percent | 430. |
| Modulus/300% | 740 p.s.i. |
| Oven aged for 72 hours at 300° F.: | |
| Tensile strength | 900 p.s.i. |
| Elongation | 300%. |
| Shore hardness | 65. |
| Ozone resistance | After 6 hours exposure to ozone, the pads were still smooth and uncracked. |
| Dynamic modulus tests: | |
| Percent relative damping | 35.8. |
| Dynamic stiffness (K) | $447 \times 10^5$ dynes/cm.$^2$. |
| Internal viscosity ($\eta f$) | $1.315 \times 10^5$ poises-cycles/sec. |

As can be seen from the above example the cured copolymers of the invention unlike natural rubber have excellent high temperature properties and ozone resistance due to the absence of any functional groups reactive to ozone. Additionally, they have the unusual combination of high dynamic stiffness and low percent relative damping. In these properties they resemble GR-S and natural rubber. Accordingly, the cured copolymer of the invention are ideal for use in tire treads where resilience and stiffness characteristics are particularly desirable.

It is to be understood that this invention is not limited to the specific examples which have been presented for illustration purposes only. Moreover, modifications of the invention can be made by those skilled in the art without departing from the scope and spirit of the invention.

What is claimed is:

1. A process for producing a synthetic rubber which comprises:
   (1) reacting a copolymer of 5 to 95 mol percent ethylene and 95 to 5 mol percent of a $C_3$–$C_6$ alpha olefin in an inert solvent selected from the group consisting of aliphatic and aromatic hydrocarbons and their halogenated derivatives, said solvent capable of at least partially dissolving the copolymer, with a brominating agent at a temperature in the range of 20°–130° C. to form a brominated copolymer having from 1 to 10 weight percent bromine;
   (2) isolating and drying said copolymer; and
   (3) curing the dried brominated copolymer at a temperature in the range of 225°–350° F. with an aromatic polyfunctional compound containing at least one primary amine group as one of the functional groups.

2. A process according to claim 1 wherein the aromatic polyfunctional compound is 2-aminopyridine.

3. The process of claim 1 wherein the aromatic polyfunctional compound is p-phenylene diamine.

4. The process of claim 1 wherein the aromatic polyfunctional compound is 2,6-diamino pyridine.

5. The process of claim 1 wherein the aromatic polyfunctional compound is m-phenylene diamine.

6. The rubbery product of claim 5.

References Cited in the file of this patent

UNITED STATES PATENTS

| | | |
|---|---|---|
| 2,183,556 | Fawcett | Dec. 19, 1939 |
| 2,200,429 | Perrin et al. | May 14, 1940 |
| 2,364,410 | Wittaker | Dec. 5, 1944 |
| 2,405,971 | McAlevy | Aug. 20, 1956 |
| 2,850,490 | Canterino et al. | Sept. 2, 1958 |
| 2,920,064 | Baptiss et al. | Jan. 5, 1960 |

FOREIGN PATENTS

| | | |
|---|---|---|
| 478,513 | Canada | Nov. 13, 1951 |